Oct. 1, 1968     O. H. LINDEMANN     3,404,024

METHOD OF DIP COATING

Filed June 1, 1964

United States Patent Office 3,404,024
Patented Oct. 1, 1968

3,404,024
METHOD OF DIP COATING
Otto H. Lindemann, Buffalo, N.Y., assignor to Hooker Chemical Corporation, Niagara Falls, N.Y., a corporation of New York
Filed June 1, 1964, Ser. No. 371,517
7 Claims. (Cl. 117—113)

ABSTRACT OF THE DISCLOSURE

A method of decreasing sags produced on articles during dip coating which comprises immersing an article to be coated into a volume of coating composition, effecting a periodic wave movement on the surface of the coating composition, the amplitude of which wave movement is at least about 0.10 inch, and withdrawing the article through said surface.

---

This invention relates to a method of dip coating and more particularly, to a method of preventing sags and tears during the dip coating of articles having irregular, complex or curved surface areas.

In the application of paints, varnishes, lacquers, and the like, dip coating is often a preferred method. Various techniques have been devised to expedite dip coating procedures. The advent of nonflammable solvents such as halogenated hydrocarbons led to the development of elevated temperature procedures. Whether conventional procedures such as room temperature dip coating with conventional flammable solvents or elevated temperature coating with nonflammable solvents is used, it has been found to be difficult to coat articles having irregular, complex or curved surface areas, without causing sags or tears.

It has been well recognized in the art that the surface of the coating composition used in dip coating is desirably maintained in a non-turbulent state. Numerous procedures and methods have been devised to keep a calm liquid surface in dip coating tanks while also effecting a smooth steady agitation, so as to retain pigments in suspension without causing surface turbulence. A calm, turbulence-free surface normally effectively reduces lapping and corduroy effects on most articles being dip coated. However, certain articles, having surface configurations such that a portion of the surface area is withdrawn from the coating composition at a velocity different from other portions, result in sags becoming more pronounced as greater differences in velocity occur between the withdrawal rate and the rate of liquid crossing the article surface area. Articles such as bowls, cups, saucers, ashtrays and the like having substantially curved and often recurved and complex configurations, have previously been extremely difficult to dip coat without producing sags on convex and concave surface areas.

It is an object of this invention to provide a method of preventing sags on the surfaces of irregular, complex and curved articles during dip coating procedures. Another object is to provide a method of eliminating sags on articles in which the rate of liquid crossing the article surface changes at a constant article withdrawal rate. These and other objects will become apparent to those skilled in the art from the description of the invention.

The objects of this invention are accomplished by a process which prevents or minimizes sags produced on articles during dip coating. In accordance with the invention, such a process comprises immersing an article to be coated into a volume of coating composition, effecting a periodic wave movement on the surface of the coating composition and withdrawing the article through said surface.

The present method overcomes the difficulties normally experienced in dip coating articles having irregular, complex or substantially curved surface areas. As changes in the slope of the surface of the coated article occur with respect to the liquid coating composition surface the velocity of liquid receding from the article varies from the withdrawal rate of the article, often becoming several to many times the withdrawal rate. The velocity changes cause changes in film thickness on the article resulting in sags where heavier films overlap thinner films.

The present invention eliminates, decreases, or minimizes sags and tears previously produced on the described articles, by means of a periodic wave movement on the liquid coating composition surface.

The invention is readily understood by reference to the accompanying drawing in which.

Figure 1:
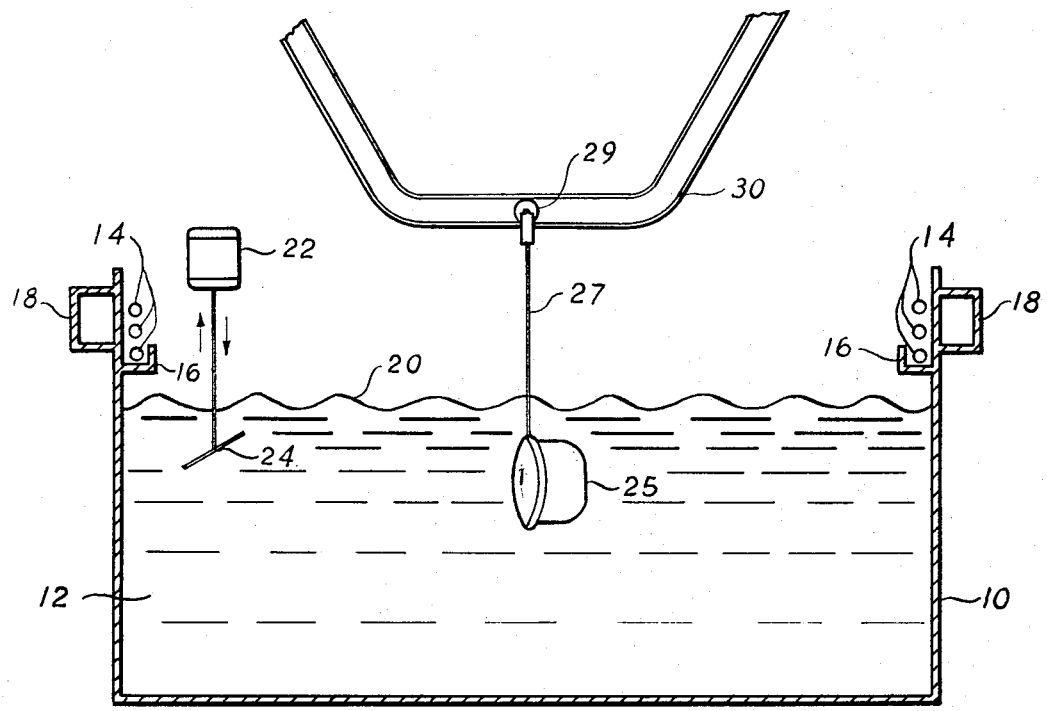
FIG. 1 is a vertical sectional view of a dip tank and article being coated in accordance with the present invention.

The embodiment illustrated in FIG. 1 is a dip tank 10 containing coating composition 12, having cooling coils 14, drain trough 16 and water jacket 18 for maintaining a chilled zone above the liquid surface. Such a tank is normally used in elevated temperature applications but is also useful for room temperature coating processes. Periodic waves 20 are made by motor 22 driving oscillating angled paddle 24. Convexo-concave article 25, resembling a cup, is suspended on hanger 27, having pulley 29 which rides on monorail conveyor 30. In the coating process, article 25 is lowered into dip tank 10 as it is conveyed on conveyor 30, and is subsequently withdrawn to produce a coated article as in FIG. 2.

Figure 2:
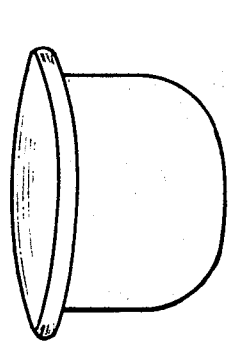
FIG. 2 is a side elevation of an article coated by the process of this invention.
Figure 3:
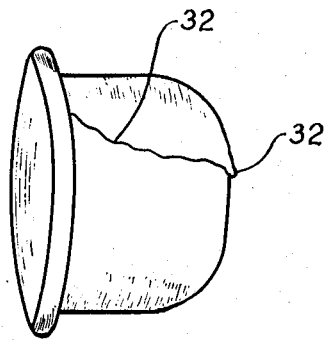
FIG. 3 is a side elevation of an article coated by conventional calm-surface methods.

FIG. 2 illustrates an article coated by the present process. The coating is smooth without sags or tears. FIG. 3 illustrates a similar article coated by conventional calm-surface techniques. A sag 32 is shown, as is formed on this type article. Sags and tears are also formed on the concave portion of article 25.

Previous methods of eliminating sags in articles required softening of the film formed, by passing the article through a solvent chamber or heating the article, causing the sag to flow out. Such procedures require additional processing steps as well as additional space and equipment. The need for solvent chambers or heating chambers for removal of sags is eliminated by the process of this invention.

The term "irregular, complex and/or curved configuration" defines articles having curved geometric surface areas as those found in bowls, cups, saucers, pans, ashtrays and the like, spherical, ellipsoid, hyperboloid, elliptical, parabolic, hyperbolic-paraboloid and the like curvatures, and irregular curved surfaces. Such curved configurations often have curves and recurves, such as is seen on the rim or lip of an article and will hereinafter be referred to as curved configurations.

Articles of this type, when positioned for dip coating, when hung on hangers or placed in baskets, have surface areas in which the slope changes in relation to the surface of the coating composition. The placement of articles on hangers for dipping is normally such as to afford maximum drainage of coating composition from the article. As an example, a bowl, having a substantially parabolic shape would be placed on a hanger so as to be withdrawn from the coating solution in a manner such that the axis of the paraboloid be substantially parallel to the plane of the liquid surface on withdrawal. Such a position affords maximum coverage with coating composition on immersion without air entrapment. On withdrawal of the article, maximum drainage is effected without entrapment of excess coating. In this desirable dip coating position, the article has points on its surface area at which the slope of a line tangent at a point on the surface, changes in relation to the slope at another point, thereby effecting a change in the flow rate across the surface area. Such a change causes sags when coating by conventional methods. The present method eliminates or reduces such sag formation.

Therefore, a further method of defining the articles preferably coated by the process of this invention are those articles wherein a change in slope occurs either gradually or abruptly on the surface area of the article, effecting a change in the flow rate of liquids across the surface when articles are withdrawn from a liquid coating composition.

Articles coated by the process of this invtntion are immersed and withdrawn from the coating composition at normal withdrawal rates and by normal dip coating techniques such as positioning the articles on hangers or in baskets suspended from a monorail conveyor. Other methods such as hand dipping can also be used. The normal withdrawal rate varies from about 2 feet per minute to about 100 feet per minute.

The coating compositions used in the practice of this invention are often referred to as paints, lacquers, varnishes, enamels and similar protective coatings. They are characterized by being comprised of a volatile or solvent portion and a nonvolatile or film forming portion. The volatile or solvent portion of the composition may be a conventional solvent such as toluene, xylene, mineral spirits, kerosene, alcohols, esters such as ethyl acetate or naphtha, or more desirably for elevated temperature application, substantially nonflammable halogenated aliphatic hydrocarbon solvents. Examples of halogenated solvents include trichlorethylene, perchlorethylene, the trichlorethanes, and tetrachlorethane, methylene chloride, ethylene dichloride, ethylidene chloride, the dichlorotetrafluoroethanes, the trichlorotetrafluoroethanes, the trichlorodifluoroethanes, the tetrachlorodifluoroethanes, the fluorotrichloroethanes, the fluorotetrachloroethanes, methyltrichloroethylene, 1,2-dichloropropane, 1,2-dichloropropene, 1,1,2-trichloropropane, ethyltrichloroethylene and mixtures thereof as well as other halogenated compounds similar in properties to those recited above.

As will be noted, these materials are often of about 1 to 4 carbon atoms and about 1 to 6 halogen atoms. Of these, the preferred material is trichlorethylene and the preferred use is at elevated temperatures.

The non-volatile or film-forming portion of the coating composition may be organic and/or inorganic. Normally, coating compositions such as paints, lacquers and varnishes contain both organic and inorganic materials. The primary requirement of the coating composition is that it be compatible with the solvent used.

The particular film-forming material used can be of either the thermoplasitc or thermosetting type. These include film-forming vehicles hardened by mere evaporation of solvent, as well as those requiring a subsequent curing step to completely harden the vehicle. The most preferred vehicles are those which quickly assume a fixed adherent film after withdrawing from the coating composition. Such vehicles include varnishes, lacquers, enamels, alkyds, aminoplastic resins, epoxy oils, epoxy resins, phenolic resins, phenolic modified resins, drying oils and the like, in addition to various modifications thereof. When the coating composition is one which contains pigments, fillers and the like insoluble materials, the periodic wave making action disperses the insoluble materials and maintains uniformity throughout coating composition.

The temperature of the coating composition is maintained between 20 degrees centigrade and about 146 degrees centigrade. When using the preferred solvent, trichlorethylene, the preferred temperature range is 65 degrees centigrade to 88 degrees centigrade. The preferred temperature range for halogenated hydrocarbon solvents is that just below their boiling points, e.g., 88 degrees centigrade for trichlorethylene and 146 degrees centigrade for perchlorethylene. When conventional solvents such as mineral spirits, toluene, xylene, and the like are used, it is desirable to maintain the compositions near room temperature, e.g., 20 degrees centigrade to 25 degrees centigrade, so as not to increase the danger of explosion and fire.

The coating composition preferably has a viscosity at the operating temperature ranging from a No. 1 Zahn cup viscosity of about 15 seconds up to about 45 seconds. Such a viscosity provides a fluid composition which readily permeates the article being coated and reduces the drainage time on removing from the coating solution.

When using elevated temperature coating techniques it has been found that best results are obtained when the articles to be coated are clean, hot and dry. This can be achieved by cleaning the articles in a halogenated hydrocarbon vapor-degreaser and phosphatizing immediately prior to dip coating. A phosphatizing step is often desirable to increase the adherence of the coating composition.

The periodic wave movement created on the coating solution surface is similar to ripples or waves created by disturbing a liquid surface. The rippling of the coating composition surface area is readily effected by any of several means. The dip coating tank or container can be agitated or vibrated to produce the rippling effect, jets of liquid can be positioned so as to cause a breaking of the surface area and a resulting ripple or turbulence, a pumping action of a flat surface on or under the liquid level can be used to create waves or some other convenient means can be employed. The method used in creating the periodic movement determines the complexity and pattern of the ripple or wave. It has been found that the amplitude of the periodic movement is apparently the significant factor to be considered in achieving the best results, rather than the complexity of the movement.

The rippling of the surface can be further defined as a wave or periodic vibration crossing the liquid surface wherein the amplitude of the wave varies from about 0.10 inch to about 1.0 inch or more. The amplitude is represented by one half of the height from the trough to the crest of the wave. The frequency may be varied to suit the withdrawal rate and the particular article being coated. The frequency preferred ranges between about 30 vibrations per minute and about 600 vibrations per minute. Depending on the particular size and shape of the container in which the coating is carried out, there will be a proportion of reflected waves adding to the complexity of the agitated surface.

The wavelength $\lambda$, is the distance, measured along the direction of propagation, between two points which are in phase on adjacent waves. The preferred wavelength varies between about 0.1 inch and about 4.0 inches. These measurements can be correlated to obtain the wave velocity $V$ by the expression $$V = \sqrt{\frac{g\lambda}{2\pi} + \frac{2\pi T}{\lambda d}}$$

where $g$ is the acceleration due to gravity, $T$ is the surface tension, $d$ is the density of the liquid and $\lambda$ is the wavelength. Thus, it is seen that the wave velocity will vary with the particular coating composition used. It has been found that by adjusting the amplitude and frequency within the stated ranges, and adjusting the viscosity of the coating composition as stated, a desirable wave velocity is achieved.

The invention will be readily understood from reference to the following examples, which are illustrative of certain preferred embodiments of the present invention. Unless otherwise indicated, all temperatures are in degrees centigrade and all parts and percentages used herein are by weight.

Example 1

The method of this invention was used to coat a brass circular, 9¼ inch diameter, curved side, flat bottomed and recurved rim bowl having a depth of 2½ inches. Previous attempts to coat this article using conventional hot trichlorethylene calm-surface coating techniques were unsuccessful in eliminating sag formation on the concave and convex portions of the bowl.

The bowl was first vapor degreased by passing it through a trichlorethylene vapor zone maintained at a temperature of about 90 degrees centigrade. The bowl was then immediately dipped into a prepared hot clear acrylic coating composition thinned with trichlorethylene. The coating composition was of a No. 1 Zahn cup viscosity of 19.5 seconds at the operating temperature of 88 degrees centigrade. The surface of the hot coating composition was rippled by a reciprocal motor having a shaft driven vertical oscillating motion. Attached to the oscillating shaft was a paddle of 15 square inches area which was positioned beneath the liquid surface in a plane at an angle of 20 degrees from horizontal. The speed of the motor was adjusted to operate at 120 strokes per minute. The amplitude of the wave produced on the surface of the coating solution was 0.25 inch and the wavelength was about 1.5 inches. This amplitude and the accompanying frequency produced a smooth rippling action across the surface of the coating composition without causing splashing.

The bowl was immersed in the coating composition and withdrawn at a constant rate of 20 feet per minute through the rippled coating composition surface. The washing effect of the ripples oscillating along the bowl surface at the interface during withdrawal, eliminated sags and produced an even coating over the entire surface area.

Example 2

The method of this invention was again used to coat a parabolically shaped article having a diameter at its largest point equal to 14 inches and a depth of 12 inches. Previous attempts to dip coat this article by conventional hot trichlorethylene processes without producing sags had been unsuccessful.

A hot solution of coating composition, comprising a pigmented phenolic modified varnish thinned with sufficient trichlorethylene to produce a No. 1 Zahn cup viscosity of 23.8 seconds at the operating temperature of 85 degrees centrigrade was used. A rippling action was effected on the surface of the coating composition by directing jets of liquid coating composition from beneath the surface toward the surface so as to cause a break in the surface and a resulting rolling action. The force of the jets was sufficient to cause a wave having an amplitude of about one-half inch and a frequency of about 60 cycles per minute. The wavelength produced was about 1½ to 1¾ inches.

The article to be coated was first degreased by passing through a trichlorethylene solvent vapor zone maintained at a temperature of about 90 degrees centigrade and then was phosphatized. The object was then immersed while still hot from the phosphatizing step, into the agitated coating composition. The article was then withdrawn through the rippled surface at a rate of about 30 feet per minute. Examination of the coated article revealed that sagging was eliminated and an even film thickness obtained.

While there have been described various embodiments of the invention, the methods described are not intended to be understood as limiting the scope of this invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principle may be utilized.

What is claimed is:

1. A method of decreasing sags produced on articles during dip coating comprising immersing an article to be coated into a volume of coating composition, effecting a periodic wave movement on the surface of the coating composition, the amplitude of which wave movement is at least about 0.10 inch, and withdrawing the article through said surface.

2. The method of claim 1 wherein the wave movement has an amplitude of 0.10 inch to about 1.0 inch and a frequency of about 30 vibrations per minute to about 600 vibrations per minute.

3. The method of claim 2 wherein wavelength ranges from about 0.10 inch to about 4 inches.

4. The method of claim 3 wherein the article being coated has a curved configuration such that a change in slope occurs on the surface area of the article effecting a change in the flow rate of liquids across the surface on withdrawing from a liquid coating composition.

5. The method of claim 4 wherein the coating composition is a halogenated hydrocarbon thinned composition.

6. The method of claim 5 wherein the coating composition is maintained at a temperature between 20 degrees centigrade and about 146 degrees centigrade and the viscosity is maintained between a No. 1 Zahn cup viscosity of about 15 seconds to 45 seconds.

7. A method of decreasing sags and tears produced on articles during dip coating comprising immersing an article of curved configuration into a volume of coating composition, effecting a periodic wave movement on the surface of the coating composition having an amplitude of 0.10 inch to about 1.0 inch and a wavelength of about 0.10 inch to about 4.0 inches and withdrawing the article through said surface.

References Cited

UNITED STATES PATENTS

| | | | |
|---|---|---|---|
| 2,554,803 | 5/1951 | Wysocki | 117—102 X |
| 2,661,307 | 12/1953 | Foster | 117—113 X |
| 2,728,686 | 12/1955 | Borushko | 117—113 X |
| 2,861,897 | 11/1958 | Hendrixson | 117—113 X |
| 3,011,914 | 12/1961 | Pflug | 117—113 |
| 3,083,538 | 4/1963 | Gross | 259—95 X |

ALFRED L. LEAVITT, *Primary Examiner.*

C. R. WILSON, *Assistant Examiner.*